(12) United States Patent
Veselic

(10) Patent No.: US 8,063,606 B2
(45) Date of Patent: Nov. 22, 2011

(54) BATTERY CHARGER FOR A HANDHELD COMPUTING DEVICE AND AN EXTERNAL BATTERY

(75) Inventor: Dusan Veselic, Oakville (CA)

(73) Assignee: Research In Motion Limited, Waterloo, ON (CA)

( * ) Notice: Subject to any disclaimer, the term of this patent is extended or adjusted under 35 U.S.C. 154(b) by 842 days.

(21) Appl. No.: 11/747,388

(22) Filed: May 11, 2007

(65) Prior Publication Data

US 2008/0278119 A1 Nov. 13, 2008

(51) Int. Cl.
*H02J 7/00* (2006.01)
*H02J 7/04* (2006.01)

(52) U.S. Cl. ........ 320/119; 320/124; 320/125; 320/138; 320/161; 320/162

(58) Field of Classification Search .................. 320/119
See application file for complete search history.

(56) References Cited

U.S. PATENT DOCUMENTS

| | | | |
|---|---|---|---|
| 5,963,015 A * | 10/1999 | Lee | 320/128 |
| 6,005,358 A | 12/1999 | Radev | |
| 6,445,159 B1 * | 9/2002 | Ramsden | 320/119 |
| 6,794,851 B2 | 9/2004 | Murakami et al. | |
| 7,135,837 B2 * | 11/2006 | Patino | 320/125 |
| 2005/0099161 A1 * | 5/2005 | Sato | 320/134 |
| 2005/0134219 A1 | 6/2005 | Patino | |
| 2005/0189921 A1 * | 9/2005 | Bayne et al. | 320/138 |

OTHER PUBLICATIONS

Canadian Intellectual Property Office, Office Action for Canadian Patent App. No. 2,627,964, Aug. 17, 2010.

* cited by examiner

*Primary Examiner* — Edward Tso
*Assistant Examiner* — Johali Torres Ruiz
(74) *Attorney, Agent, or Firm* — Borden Ladner Gervais LLP; Jeffrey W. Wong

(57) ABSTRACT

A battery charger includes a power source for supplying a primary charge current to a first battery, and a charge manager for charging a second battery. The charge manager is coupled to the power source and is configured to charge the second battery with a secondary charge current in accordance with a continuous comparison between a predefined maximum current limit and a total current drawn from the power source.

16 Claims, 7 Drawing Sheets

BATTERY CHARGER FOR A HANDHELD COMPUTING DEVICE AND AN EXTERNAL BATTERY

FIELD OF THE INVENTION

The invention described herein relates to a battery charger. In particular, this invention relates to a method and apparatus for simultaneously charging multiple batteries.

BACKGROUND OF THE INVENTION

It is not uncommon for operators of battery-powered portable communications devices, such as wireless telephones, personal data assistants, wireless pagers, and portable computers, to carry one or more spare batteries to extend the operational time of the device. External-type chargers are popular because they allow the operator to continue using the communications device while the other battery charges. However, typically portable chargers only allow a single battery to be charged at a time. Such "single-capacity" chargers have the obvious disadvantage of requiring lengthy recharge periods, particularly where the operator has multiple spare batteries. Therefore, attempts have been made to provide a battery charger that allows the operator to charge more than one battery at a time.

For instance, Murakami (U.S. Pat. No. 6,794,851) describes an external battery charger that allows a mobile phone to charge the battery that is installed in the mobile phone, while simultaneously charging a second battery that is external to the mobile phone. To apportion the charge current between the batteries, Murakami makes use of the fact that the resistance of a battery increases as the battery becomes charged.

Frame (U.S. Pat. No. 6,005,358) describes a portable computer docking station that supplies power to a portable computer, and includes a first charge circuit for charging the battery installed in the portable computer, and a second charge circuit for charging the battery installed in the docking station. Each charge circuit measures the current that is drawn from the power supply, and adjusts the charge current that they supply to their respective batteries based on these measurements.

None of these solutions make optimum use of the maximum charge current that is available from the power supply. As a result, charge times are unnecessarily long.

BRIEF DESCRIPTION OF THE DRAWINGS

The invention will now be described in detail, by way of example only, with reference to the accompanying drawings, in which.

DETAILED DESCRIPTION OF THE PREFERRED EMBODIMENT

Figure 1:
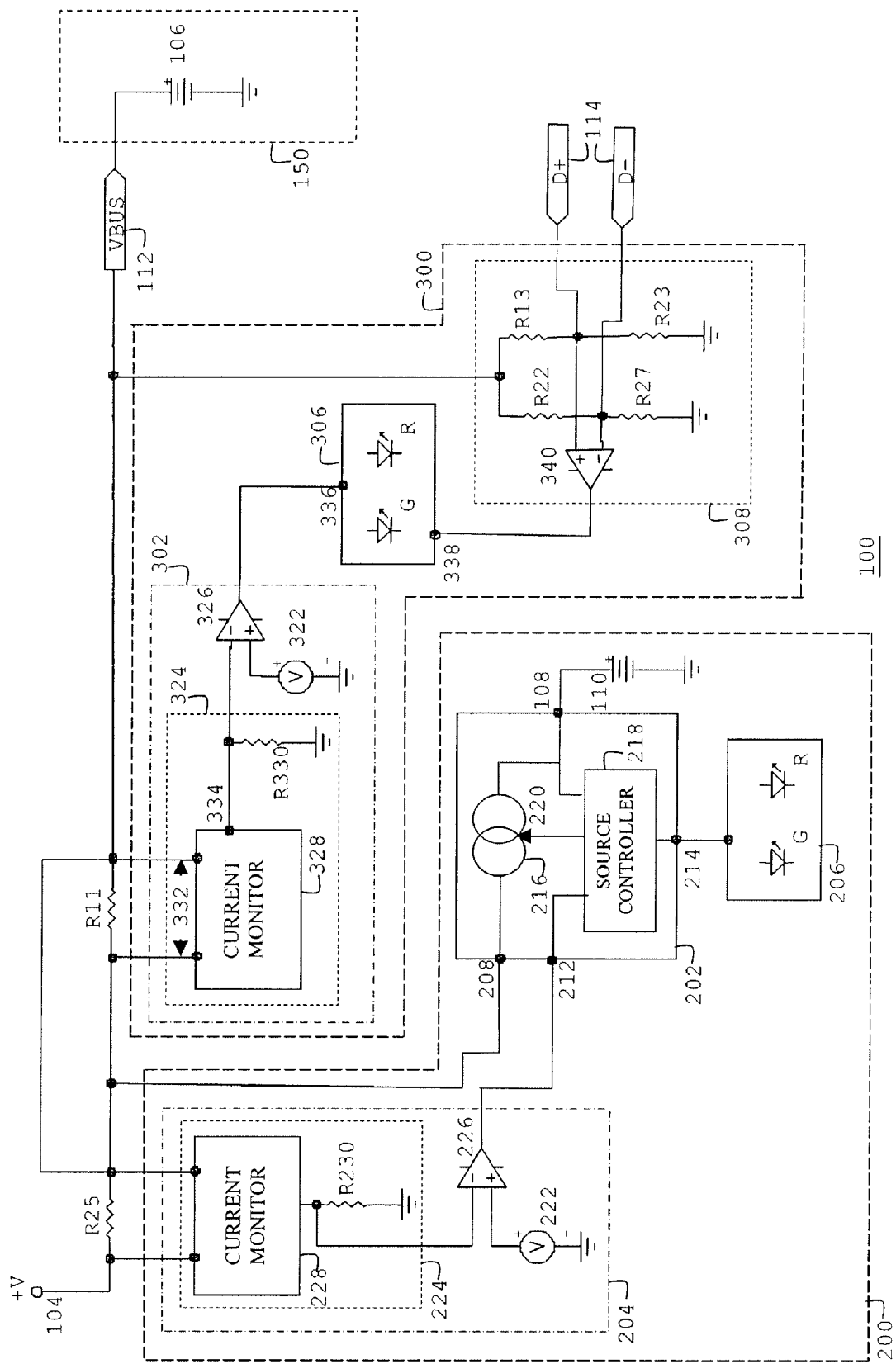
FIG. 1 is an overview schematic diagram of the battery charger.

By way of overview, the invention described herein relates to a battery charger and a method for simultaneously charging multiple batteries.

As will be described in further detail below, the battery charger includes a power source for supplying a primary charge current to a first of the batteries, and a charge manager for charging a second of the batteries. The charge manager is coupled to the power source and is configured to charge the second battery with a secondary charge current in accordance with a continuous comparison between a predefined maximum current limit and a total current drawn from the power source.

In a preferred implementation, the charge manager comprises a controlled current/voltage source which supplies the secondary charge current, and a charge manager controller coupled to the controlled source. The charge manager controller is configured to control the magnitude of the secondary charge current by outputting to the control input of the controlled source an analog difference signal that is proportional to the difference between the magnitude of the maximum current limit and the total drawn current.

Further, preferably the charge manager controller comprises a voltage reference, a current monitor coupled to the power source, and a differential amplifier coupled to the voltage reference and the current monitor. The voltage reference is proportional to the maximum current limit, and the current monitor outputs an analog voltage that is proportional to the total drawn current. The analog difference signal is output by the differential amplifier and is proportional to the difference between the voltage reference and the analog voltage.

In addition, preferably the charge manager and the power supply are disposed within a common charger housing, and the charger housing comprises a first indicator for indicating a charge state of the first battery, and a second indicator for indicating a charge state of the second battery.

As will be described in further detail below, the method of simultaneously charging multiple batteries involves supplying a primary charge current from a power source to a first of the batteries, while charging a second of the batteries with a secondary charge current from the power source in accordance with a continuous comparison between a predefined maximum current limit and a total current drawn from the power source.

In a preferred implementation, the second battery charging step comprises controlling the magnitude of the secondary charge current by outputting to a control input of a controlled current/voltage source an analog difference signal that is proportional to the difference between the magnitude of the maximum current limit and the total drawn current.

Further, the analog difference signal is proportional to the difference between a voltage reference and an analog voltage signal. Preferably, the voltage reference is proportional to the maximum current limit, and the analog voltage signal is proportional to the total drawn current.

In addition, preferably the first battery is disposed within a handheld computing device, and the second battery is charged with a continuously increasing portion of the secondary charge current while the handheld computing device charges the first battery with a continuously decreasing portion of the primary charge current. Preferably, the total of the decreasing portion and the increasing portion is substantially equal to the maximum current limit.

1. Battery Charger 100

Referring now to FIG. 1, there is shown a battery charger, denoted generally as 100, according to the invention. The battery charger 100 includes a DC power source (not shown), and a charge manager 200. Optionally, the battery charger 100 also includes a primary charge state indicator 300.

The DC power source has a DC voltage output 104 for outputting a substantially constant DC output voltage. Typically, the DC power source comprises an AC/DC converter which is configured to convert an AC input voltage to the DC output voltage. However, other DC power sources, such as DC batteries and DC/DC converters, are also encompassed by the invention.

The battery charger 100 also comprises a charger housing (not shown). Preferably, both the DC power source and the charge manager 200 are disposed within the charger housing. The charger housing includes a first battery interface for connection to a first battery 106, and a second battery interface 108 for connection to a second battery 110. Preferably, the charger housing also includes a recessed section for retaining the second battery 110 in position, externally to the housing, when the second battery 110 is connected to the second battery interface 108.

Further, preferably the first battery interface includes both a first battery charge port 112, and a data port 114. The DC power source is coupled to the first battery charge port 112 via the DC voltage output 104, and supplies primary charge current to the first battery 106 via series resistors R25, R11 and the first battery charge port 112. As will be explained below, the series resistors R25, R11 are low resistance loads that are used to measure the total current that is drawn from the DC power source.

As shown, preferably the first battery 106 is disposed within a handheld computing device 150 which includes an internal battery charger for charging the first battery 106. The handheld computing device 150 connects to the first battery charge port 112 through power lines having sufficient gauge to carry the primary charge current to the handheld computing device 150. The internal battery charger charges the first battery 106 from the primary charge current that it receives from the battery charger 100 via the power lines.

The handheld computing device 150 also interfaces with the data port 114 (if present) via data communication lines. Typically, the power lines and the data communications lines are provided as a Universal Serial Bus (USB) cable. In the example shown, the data communications lines comprise USB D+/D− data lines. As will be explained, the battery charger 100 uses data received from the handheld computing device 150, via the USB cable, to determine when the handheld computing device 150 is connected to the battery charger 100.

The charge manager 200 is connected at its input to the DC voltage output 104 of the DC power source. The charge manager 200 is also connected at its output to the second battery interface 108, and supplies secondary charge current to the second battery 110 via the second battery interface 108.

Typically, the total of the rated maximum charge current of the first battery 106 and the rated maximum charge current of the second battery 110 is greater than the maximum current limit of the power source. Therefore, as will be explained in greater detail below, to avoid the possibility of the power source being overloaded when both batteries 106, 110 are interfaced with the battery charger 100, the charge manager 200 is configured to charge the second battery 110 with a secondary charge current whose magnitude is determined in accordance with a continuous comparison between the maximum current limit and the total current drawn from the power source.

The primary charge state indicator 300 (if present) indicates the state of charge of the first battery 106. The primary charge state indicator 300 is connected at its input to the DC voltage output 104 of the DC power source. Typically, the primary charge state indicator 300 is disposed within the charger housing, and includes a pair of different-coloured indicator lamps which are visible from the outer surface of the battery housing for providing a visual indication of the charge state of the first battery 106.

2.0. Charge Manager 200

The charge manager 200 comprises a battery charge circuit 202, a charge controller 204, and a secondary charge state indicator 206.

As will be explained, the charge manager 200 is configured to determine the available secondary charge current by continuously comparing the total current that is drawn from the DC power source against the maximum current limit of the DC power source. The charge manager 200 ensures that the secondary charge current that is drawn by the second battery 110 does not exceed the calculated available secondary charge current.

2.1. Battery Charge Circuit 202

The battery charge circuit 202 includes a voltage supply input 208, a battery output, a charge current program input 212, and a charge status output pin 214. The battery charge circuit 202 is connected at its voltage supply input 208 to the DC voltage output 104 of the DC power source, and is connected at its battery output to the second battery interface 108.

The battery charge circuit 202 circuit also comprises a controlled current/voltage source 216, and a source controller 218 that is connected to the controlled current/voltage source 216.

As will be explained, the battery charge circuit 202 supplies the secondary charge current to the second battery 110, via both a constant current charge mode, and a constant voltage charge mode.

2.1.1. Controlled Current/Voltage Source 216

The controlled current/voltage source 216 includes a voltage input, a voltage/current output, and a control input 220 which controls the voltage/current that is output by the controlled source 216 at the current output. The controlled current/voltage source 216 is connected at its voltage input to the voltage supply input 208, and is connected at its voltage/current output to the battery output.

2.1.2. Source Controller 218

The source controller 218 includes a charge mode input, a battery sensor input, a control output, and a charge status output.

The source controller 218 is connected at its charge mode input to the charge current program input 212, and is connected at its battery sensor input to the battery output. The source controller 212 is also connected at its control output to the control input 220 of the controlled source 216, and is connected at its charge status output to the charge status output pin 214 of the battery charge circuit 202.

The source controller 218 includes control logic that controls the signal that is output on the control output of the source controller. The control logic is configured to provide the battery charge circuit 202 with two charge modes, based on the voltage at the battery output. In constant current mode, the voltage/current output of the controlled source 216 supplies a constant current to the battery output. In this mode, the constant current is proportional to the resistance at the charge current program input 212. In constant voltage mode, the voltage/current output of the controlled source 216 maintains a constant voltage at the battery output.

Typically, the battery charge circuit 202 transitions from constant current mode to constant voltage mode when the voltage at the battery output, as read by the source controller 218, exceeds a predetermined float voltage.

The source controller 218 also includes logic circuitry that indicates the charge state of the second battery 110. Typically, the logic circuitry is configured to output a low impedance path to signal ground at the charge status output when the voltage sensed at the battery sensor input indicates that the second battery 110 is in constant-current charge mode, and to output a larger impedance path to signal ground at the charge status output when the voltage sensed at the battery sensor input indicates that the second battery 110 is in constant-voltage charge mode and the secondary charge current has dropped to less than 10% of the constant charge current. Therefore, the charge status output will have a low impedance when the second battery 110 is in constant-current charge mode, and will have a high impedance when the second battery 110 is being trickle charged in constant-voltage charge mode.

2.2. Charge Controller 204

The charge controller 204 comprises a DC voltage reference 222, a load current monitoring circuit 224, and a differential amplifier 226 that is coupled to the DC voltage reference 222 and the load current monitoring circuit 224.

As will be explained below, the charge controller 204 is configured to control the magnitude of the secondary charge current that is output by the battery charge circuit 202. To do so, the charge controller 204 outputs to the control input of the battery charge circuit 202 an analog difference signal that is proportional to the difference between the magnitude of the maximum current limit of the DC power source and the total current that is drawn from the DC power source.

2.2.1. Load Current Monitoring Circuit 224

The load current monitoring circuit 224 comprises a current monitor 228, and a load resistor 230.

The current monitor 228 includes a voltage sense input 232, and a current sense output 234. The current monitor 228 is connected at its voltage sense input 232 across the series resistors R25, R11, and is connected at its current sense output 234 to the load resistor 230.

The current monitor 228 measures the voltage drop at the voltage sense input 232, and outputs a current at the current sense output 234. The magnitude of the current output at the current sense output 234 is proportional to the voltage drop measured at the voltage sense input 232. Since the voltage drop measured at the voltage sense input 232 is proportional to the current drawn from the DC power source, the resulting analog voltage that is developed across the load resistor 230 is proportional to the magnitude of the current that is drawn from the DC power source.

2.2.2. Differential Amplifier 226

The differential amplifier 226 includes an inverting input, a non-inverting input, and a difference output. The differential amplifier 226 is connected at its non-inverting input to the DC voltage reference 222, and is connected at its inverting input to the junction of the load resistor 230 and the current sense output 234. Further, the differential amplifier 226 is connected at its difference output to the charge current program input 212 of the battery charger 202.

The differential amplifier 226 is configured to output an analog difference signal (via the difference output) that is proportional to the difference between the DC voltage reference 222 and the analog voltage that is output by the current monitor 228. Further, the magnitude of the voltage at the DC voltage reference 222 is proportional to the maximum current limit of the DC power source. Therefore, the analog difference signal that is output by the differential amplifier 226 is proportional to the difference between the maximum current limit of the DC power source and the total current that is drawn from the DC power source.

As discussed above, in constant current mode, the magnitude of the current that is output by the battery charge circuit 202 is proportional to the resistance at the charge current program input 212. Therefore, in constant current mode, the magnitude of the secondary charge current that is supplied to the second battery 110 is proportional to the current that is available from the DC power source. Preferably, the magnitude of the secondary charge current in constant current mode is equal to the current that is available from the DC power source.

2.3. Secondary Charge State Indicator 206

The secondary charge state indicator 206 indicates the charge state of the second battery 110.

As shown, preferably the secondary charge state indicator 206 provides a visual indication of the battery charge state, and comprises a red LED, and a green LED and suitable lamp driver circuitry. The lamp driver circuitry provides drive current to the LEDs, and includes a control input that is connected to the charge status output pin 214 of the battery charge circuit 202. Preferably, the lamp driver circuitry lights the red LED when the charge status output pin 214 indicates that the second battery 110 is in constant-current charge mode, and lights the green LED when the charge status output pin 214 indicates that the second battery 110 is trickled charged in constant voltage charge mode.

3.0. Primary Charge State Indicator 300

The primary charge state indicator 300 comprises a charge state detection circuit 302, a primary charge state indication circuit 306, and a peripheral device detection circuit 308.

As will be explained below, the primary charge state indicator 300 is configured to indicate the charge state of the first battery 106 based on the magnitude of the current that is drawn by the first battery 106.

3.1. Charge State Detection Circuit 302

The charge state detection circuit 302 comprises a DC voltage reference 322, a load current monitoring circuit 324, and a comparator 326 that is coupled to the DC voltage reference 322 and the load current monitoring circuit 324.

As will be explained below, the charge state detection circuit 302 is configured to monitor the magnitude of the primary charge current that is drawn from the first battery charge port 112. To do so, the charge state detection circuit 302 outputs to a control input of the primary charge state indication circuit 306 an analog difference signal that is proportional to the difference between the magnitude of the rated constant charge current for the first battery 106 (for constant-current charge mode) and the current that is drawn from the battery charger 100 via the first battery charge port 112.

3.1.1. Load Current Monitoring Circuit 324

The load current monitoring circuit 324 comprises a current monitor 328, and a load resistor 330.

The current monitor 328 includes a voltage sense input 332, and a current sense output 334. The current monitor 328 is connected at its voltage sense input 332 across the series resistor R11, and is connected at its current sense output 334 to the load resistor 330.

The current monitor 328 measures the voltage drop at the voltage sense input 332, and outputs a current at the current sense output 334. The magnitude of the current output at the current sense output 334 is proportional to the voltage drop measured at the voltage sense input 332. Since the voltage drop measured at the voltage sense input 332 is proportional to the current that is drawn from the DC power source via the first battery charge port 112, the resulting analog voltage that is developed across the load resistor 330 is proportional to the magnitude of the current that is drawn by the first battery 106 and the handheld computing device 150.

3.1.2. Comparator 326

The comparator 326 includes an inverting input, a non-inverting input, and a difference signal output. The comparator 326 is connected at its non-inverting input to the DC voltage reference 322, and is connected at its inverting input to the junction of the load resistor 330 and the current sense output 334. Further, the comparator 326 is connected at its signal output to a control input 336 of the primary charge state indication circuit 306.

The comparator 326 is configured to output to the primary charge state indication circuit 306 (via the signal output) an analog signal whose magnitude is based on the greater of the magnitude of the DC voltage reference 322 and the analog voltage that is output by the current monitor 328. Further, preferably the magnitude of the voltage at the DC voltage reference 322 is less than the analog voltage that is output by the current monitor 328 when the first battery 106 is in constant-current charge mode, and is greater than the maximum analog voltage that is output by the current monitor 328 when the first battery 106 is in constant-voltage charge mode and the primary charge current has dropped to less than 10% of the constant charge current. Therefore, the output signal of the comparator 326 will have a low voltage when the first battery 106 is in constant-current charge mode, and will have a high voltage when the first battery 106 is being trickle charged in constant-voltage charge mode.

3.2. Primary Charge State Indication Circuit 306

The primary charge state indication circuit 306 indicates the charge state of the first battery 106.

As shown, preferably the primary charge state indication circuit 306 provides a visual indication of the battery charge state, and comprises a red LED, a green LED and suitable lamp driver circuitry. The lamp driver circuitry provides drive current to the LEDs, and includes a control input 336 that is connected to the signal output of the comparator 326 of the charge state detection circuit 302. Preferably, the lamp driver circuitry lights the red LED when the signal output of the comparator 326 indicates that the first battery 106 is being charged with a constant current, and lights the green LED when the signal output of the comparator 326 indicates that the first battery 106 is being trickle charged in constant-voltage charge mode.

Preferably, the lamp driver circuitry also includes a gate input 338 that is used to enable/disable the charge indication produced by the primary charge state indication circuit 306.

3.3. Peripheral Device Detection Circuit 308

The peripheral device detection circuit 308 comprises a differential amplifier 340, and pullup/pulldown resistors R13, R22, R23, R27.

The differential amplifier 340 includes an inverting input, a non-inverting input, and a difference signal output. Pullup resistor R22 is connected between the first battery charge port 112 and the inverting input of the differential amplifier 340. Pulldown resistor R27 is connected between the inverting input of the differential amplifier 340 and ground. Similarly, pullup resistor R13 is connected between the first battery charge port 112 and the non-inverting input of the differential amplifier 340. Pulldown resistor R23 is connected between the non-inverting input of the differential amplifier 340 and ground.

The differential amplifier 340 is also connected at its non-inverting input to the D− data line of the data port 114, and is connected at its inverting input to the D+ data line of the data port 114. Further, the differential amplifier 340 is connected at its signal output to the gate input 338 of the primary charge state indication circuit 306.

The differential amplifier 340 is configured to output to the charge state detection circuit 302 (via the difference signal output) an analog signal whose magnitude is based on the greater of the magnitude of the voltages that are present at its respective inputs. If no handheld communications device 150 is connected to the data port 114, the pullup/pulldown resistors R13, R22, R23, R27 cause the differential amplifier 340 to output a high voltage to the gate input 338 of the primary charge state indication circuit 306. In this state, the primary charge state indication circuit 306 is disabled, and neither of its LEDs is turned on.

On the other hand, if a high speed handheld communications device 150 is connected to the data port 114 via a USB cable, the device 150 pulls the D+ data line high (thereby indicating that it is a high speed device). Since the voltage at the non-inverting input to the differential amplifier 340 will be greater than the voltage at the inverting input, the differential amplifier 340 will output a low voltage to the gate input 338 of the primary charge state indication circuit 306. In this state, the primary charge state indication circuit 306 is enabled, thereby allowing the primary charge state indication circuit 306 to activate the appropriate one of its LEDs based on the charge state of the first battery 106.

Method of Operation

Figure 2:
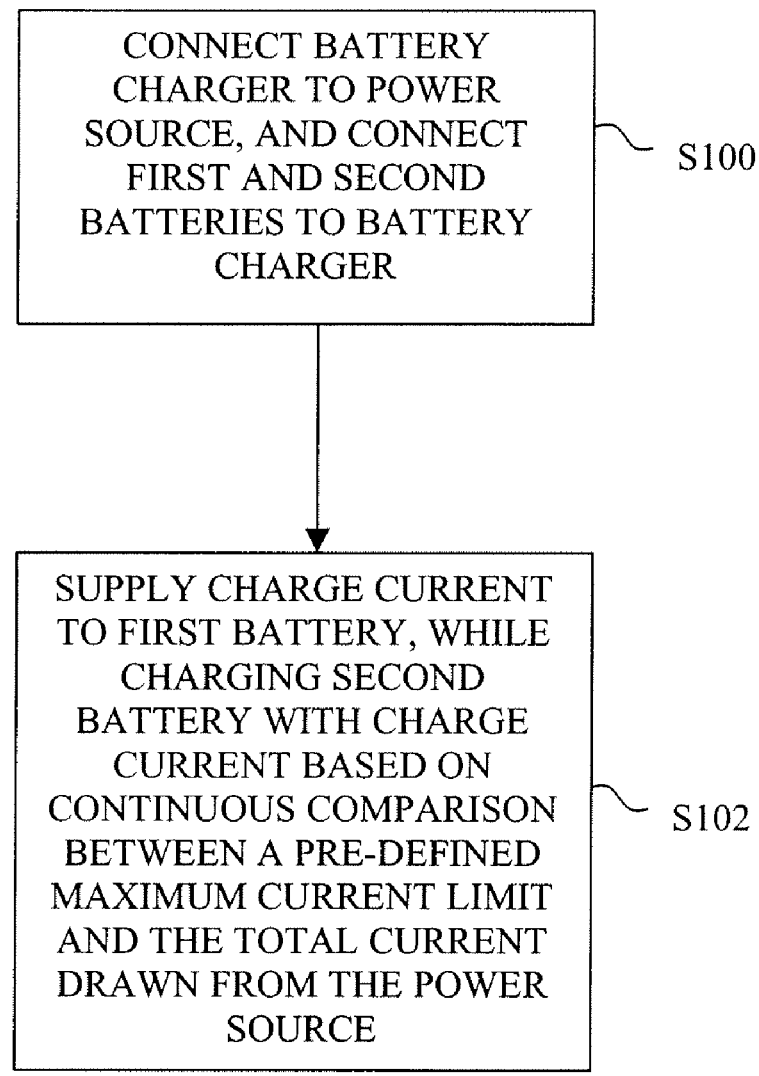
FIG. 2 is a flowchart that depicts, by way of overview, the charging method implemented by the battery charger.

The charging method effected by the battery charger 100 will now be described, by way of overview, with reference to FIG. 2.

Initially, at step S100, the batteries 106, 110 are electrically interfaced with the battery charger 100, and the DC power source in the battery charger 100 is connected to an AC power source.

At step S102, the battery charger 100 begins to supply charge current to the first battery 106 from the DC power source. Concurrently, the charge manager 200 continuously monitors the total current that is drawn from the DC power source, and supplies charge current to the second battery 110, from the DC power source, based on a continuous comparison between a predefined maximum current limit and the total current that is drawn from the DC power source.

An advantageous feature of the battery charger 100 is that it allows the first battery 106 to be charged with a first continuously decreasing portion of the maximum current that is available from the DC power source, while simultaneously charging the second battery 110 with a continuously increasing portion of the available current. In this phase, the total of the decreasing portion and the increasing portion is substantially equal to the maximum available current. As a result, more efficient use is made of the current capacity of the DC power source, thereby reducing total charging time for the batteries 106, 110.

Another advantageous feature of the battery charger 100 is that the predefined maximum current limit can be varied to apportion charge current between the batteries 106, 110 as desired. For instance, if the predefined maximum current limit is set equal to the maximum current limit of the DC power source, the first battery 106 will have full charge priority over the second battery 110. As a result, the first battery 106 will receive its rated charge current (assuming that the rated charge current is less than the maximum current limit of the DC power source), and the second battery 110 will be charged with the remaining (if any) current of the DC power source.

However, if the predefined maximum current limit is set greater than the maximum current limit of the DC power source, the first battery 106 will receive a charge current which is less than its rated charge current, depending upon the maximum current limit of the DC power source. Simultaneously, the second battery 110 will be charged with a charge current which is greater than that for the variation where the first battery 106 receives its rated charge current.

Figure 3A:
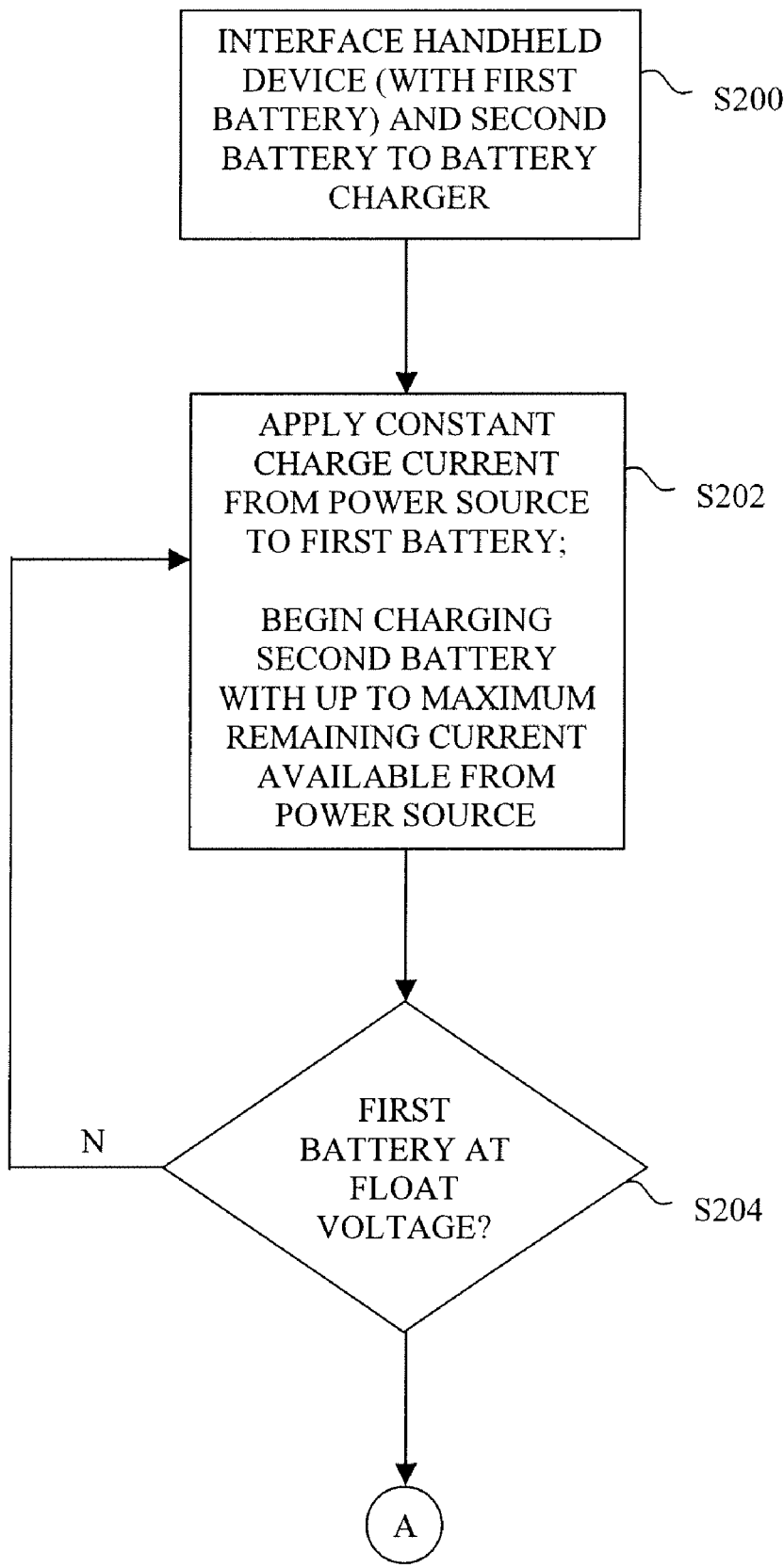
FIGS. 3A to 3C together comprise a flowchart that depicts, in detail, the charging method implemented by the battery charger.
Figure 3B:
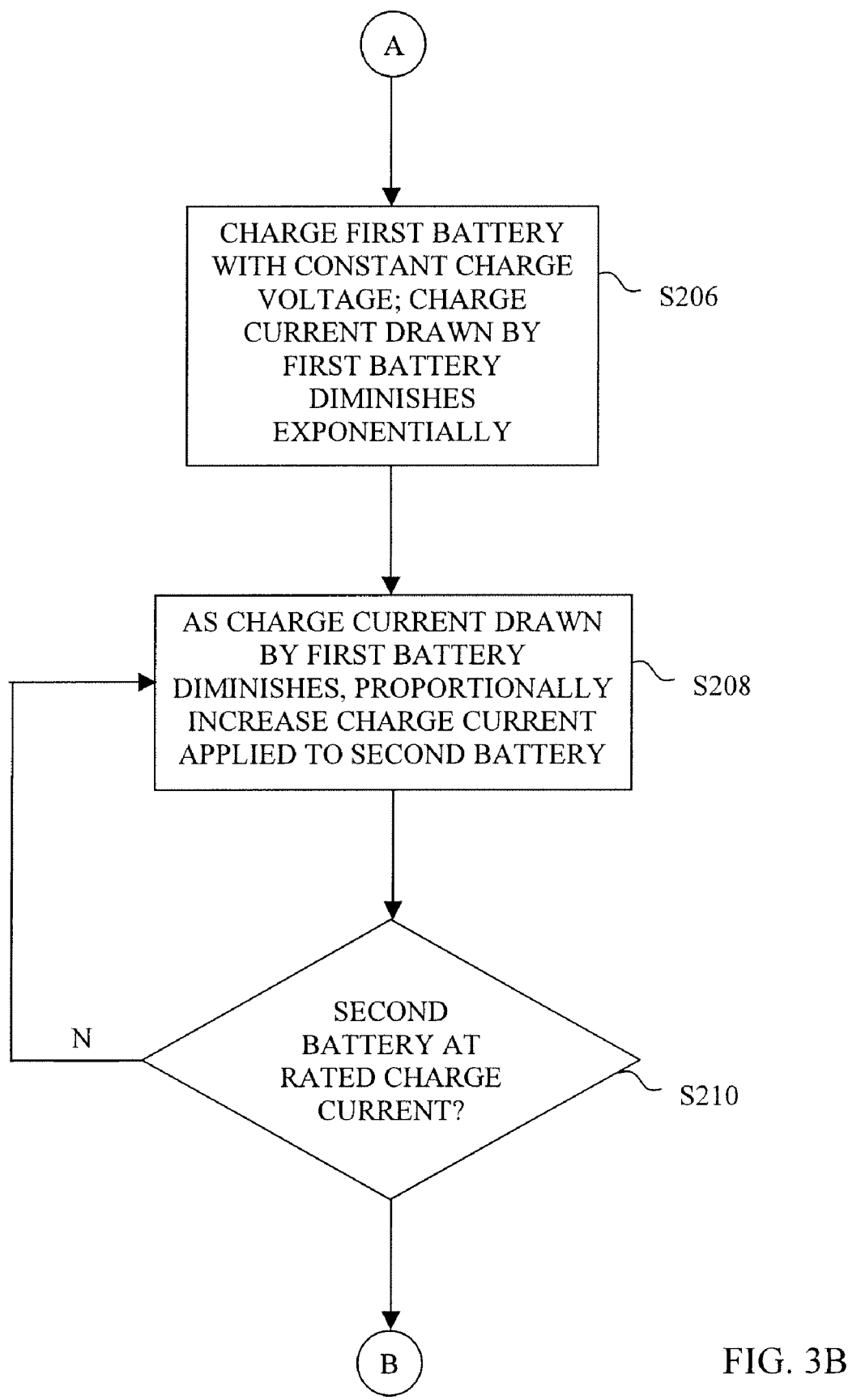
Figure 3C:
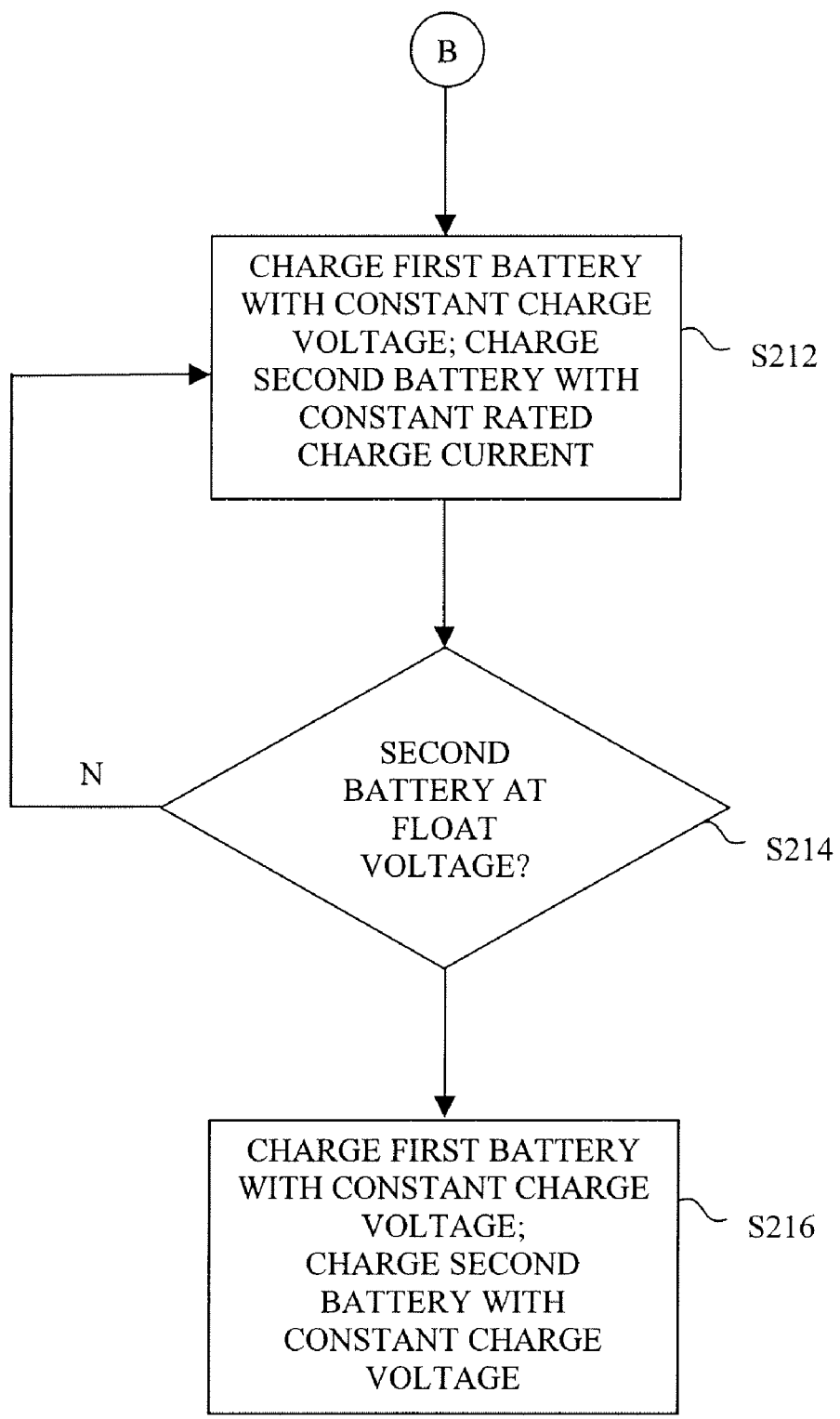

The operation of the battery charger 100 will now be explained in greater detail with reference to FIGS. 3A, 3B and 4.

At the commencement of a charge operation, at step S200, the first battery 106 is disposed within the handheld computing device 150, and the device 150 is connected to the first battery charge port 112, typically via a USB cable. Further, the second battery 110 is retained within the recessed portion of the charger housing, and is connected to the second battery interface 108.

The battery charger 100 is then connected to a source of AC power, at step S202, thereby supplying DC power to the first battery 106 and the second battery 110. Upon application of the DC power, the handheld computing device 150 enters the first master charge mode, and the charge manager 200 enters the first slave charge mode.

In first master charge mode, the handheld computing device 150 charges the first battery 106 with a substantially constant charge current. Typically, this charge current constitutes a major portion of the current that is available from the DC power source. Further, as will be discussed below, the current that can be drawn from the DC power source can be apportioned between the first battery 106 and the second battery 110 through the appropriate selection of the resistance of the load resistor 230 and the magnitude of voltage produced by the DC voltage reference 222. Therefore, depending upon the maximum current limit of the DC power source, and the manner in which the charge current is apportioned between the batteries 106, 110, the magnitude of the constant charge current applied to the first battery 106 in the first master charge mode may be equal to or less than the rated constant-current charge current for the first battery 106.

The charge state detection circuit 302 continuously monitors the current that is drawn from the DC power source via the first battery charge port 112. The DC voltage reference 322 and the load resistor 330 are selected such that, when the handheld computing device 150 charges the first battery 106 with a major portion of the current available from the DC power source, the comparator 326 of the charge state detection circuit 302 outputs a low voltage output signal. Since the control input 336 of the primary charge state indication circuit 306 is connected to the signal output of the comparator 326, the low voltage output signal in first master charge mode causes the primary charge state indication circuit 306 to light its red LED, thereby indicating that the first battery 106 is in constant-current charge mode.

Concurrently, the charge manager 200 continuously monitors the total current that is drawn from the DC power source, and thereby continuously determines the magnitude of additional current (if any) that is available to be drawn from the DC power source. The load resistor 230 and the DC voltage reference 222 are selected such that, when the handheld computing device 150 charges the first battery 106, the current drawn by the charge manager 200 and the second battery 110 from the DC power source does not exceed the remaining portion of the current that is available from the DC power source.

Therefore, in first slave charge mode, the charge manager 200 charges the second battery 110 with a substantially constant charge current. Depending upon the magnitude of the charge current that is available from the DC power source, and the rated charge current of the second battery 110, the total of the charge current applied to the first battery 106 and the charge current drawn by the charge manager 200 and the second battery 110 is typically substantially equal to, or at least does not exceed, the maximum current limit of the DC power source. Further, depending upon the maximum current limit of the DC power source, and the magnitude of the current that is drawn by the first battery 106, the magnitude of the constant charge current applied to the second battery 110 in the first slave charge mode is typically less than the rated charge current for the second battery 110 and constitutes a minor portion of the maximum current limit of the DC power source.

The logic circuitry of the source controller 218 also continuously monitors the voltage at the battery sensor input. Since voltage at the battery sensor input is usually less than the float voltage of the second battery 110 when the second battery is in constant-current charge mode, the logic circuitry outputs a low impedance path to signal ground at the charge status output. Further, since the control input of the secondary charge state indicator 206 is connected to the charge status output pin 214 of the battery charge circuit 202, the low impedance signal in first slave charge mode causes the secondary charge state indicator 206 to light its red LED, thereby indicating that the second battery 110 is in constant-current charge mode.

As shown by step S204, the handheld computing device 150 maintains the first master charge mode until the voltage of the first battery 106 reaches the rated float voltage for the first battery 106. Thereafter, at step S206, the handheld computing device 150 exits the first master charge mode and enters the second master charge mode.

In the second master charge mode, the handheld computing device 150 charges the first battery 106 with a substantially constant voltage. Due to the capacitance of the first battery 106, the magnitude of the charge current to the first battery 106 in the second master charge mode decreases exponentially.

The charge manager 200 continues to determine the magnitude of additional current that is available to be drawn from the DC power source. Therefore, the charge manager 200 continues to charge the second battery 110 with the remaining portion of the available current (if any) until the handheld computing device 150 enters the second master charge mode. At this point, the charge manager 200 exits the first slave charge mode and enters the second slave charge mode.

As the magnitude of the current drawn by the handheld computing device 150 from the DC power source diminishes exponentially, the magnitude of the analog difference signal that is output by the differential amplifier 226 diminishes. Since the difference output of the differential amplifier 226 is coupled to the charge current program input 212 of the battery charger 202, at step S208 the diminishing analog difference signal in second slave charge mode causes the secondary charge current applied to the second battery 110 (and hence the current drawn by the battery charge circuit 202 and the second battery 110) to increase exponentially.

Due to the negative feedback loop defined by the battery charge circuit 202 and the load current monitoring circuit 224, the diminishing analog difference signal also causes the magnitude of the current drawn by the battery charge circuit 202 and the second battery 110 in second slave charge mode to be substantially equal to the remaining portion of the current that is available from the DC power source. As a result, the total current that is drawn from the DC power source remains substantially constant.

As shown by step S210, the charge manager 200 continues to increase the charge current to the second battery 110 until the secondary charge current equals the rated constant-current charge current for the second battery 110. At this point, the charge manager 200 enters the third slave charge mode, at step S212, and charges the second battery 110 with a constant current which is substantially equal in magnitude to the rated charge current. Typically, this charge current constitutes a major portion of the current available from the DC power source.

Concurrently, the handheld computing device 150 continues to charge the first battery 106 with a substantially constant voltage. In view of the limited current available form the DC power source, and the current drawn by the second battery 110, the magnitude of the charge current applied to the first battery 106 in the second master charge mode continues to be a minor portion of the current available from the DC power source. As a result, the current drawn by the charge manager 200 from the DC power source in the second master charge mode does not exceed the remaining portion of the current that is available from the DC power source.

The charge state detection circuit 302 continues to monitor the current that is drawn from the DC power source via the first battery charge port 112. The DC voltage reference 322 and the load resistor 330 are selected such that, when the primary charge current has dropped to less than 10% of the constant charge current, the comparator 326 of the charge state detection circuit 302 outputs a higher voltage output signal. Since the control input 336 of the primary charge state indication circuit 306 is connected to the signal output of the comparator 326, the higher voltage output signal in second master charge mode causes the primary charge state indication circuit 306 to extinguish its red LED and to light its green LED, thereby indicating that the first battery 106 is being trickle charged.

As shown by step S214, the charge manager 200 continues to charge the second battery 110 with the rated constant charge current until the voltage measured at the charge mode input of the source controller 218 reaches the rated float voltage for the second battery 110. Thereafter, at step S216, the charge manager 200 exits the third slave charge mode and enters the fourth slave charge mode.

In the fourth slave charge mode, the charge manager 200 charges the second battery 110 with a substantially constant voltage. Due to the capacitance of the second battery 110, the magnitude of the charge current in the fourth slave charge mode decreases exponentially.

The source controller 218 continuously monitors the current that is drawn by the second battery 110. When the secondary charge current has dropped to less than 10% of the constant charge current, the logic circuitry of the source controller 218 outputs a higher impedance path to signal ground at the charge status output. Since the control input of the secondary charge state indicator 206 is connected to the charge status output pin 214 of the battery charge circuit 202, the higher impedance signal in fourth slave charge mode causes the secondary charge state indicator 206 to extinguish its red LED and to light its green LED, thereby indicating that the second battery 110 is being trickle charged.

Figure 4:
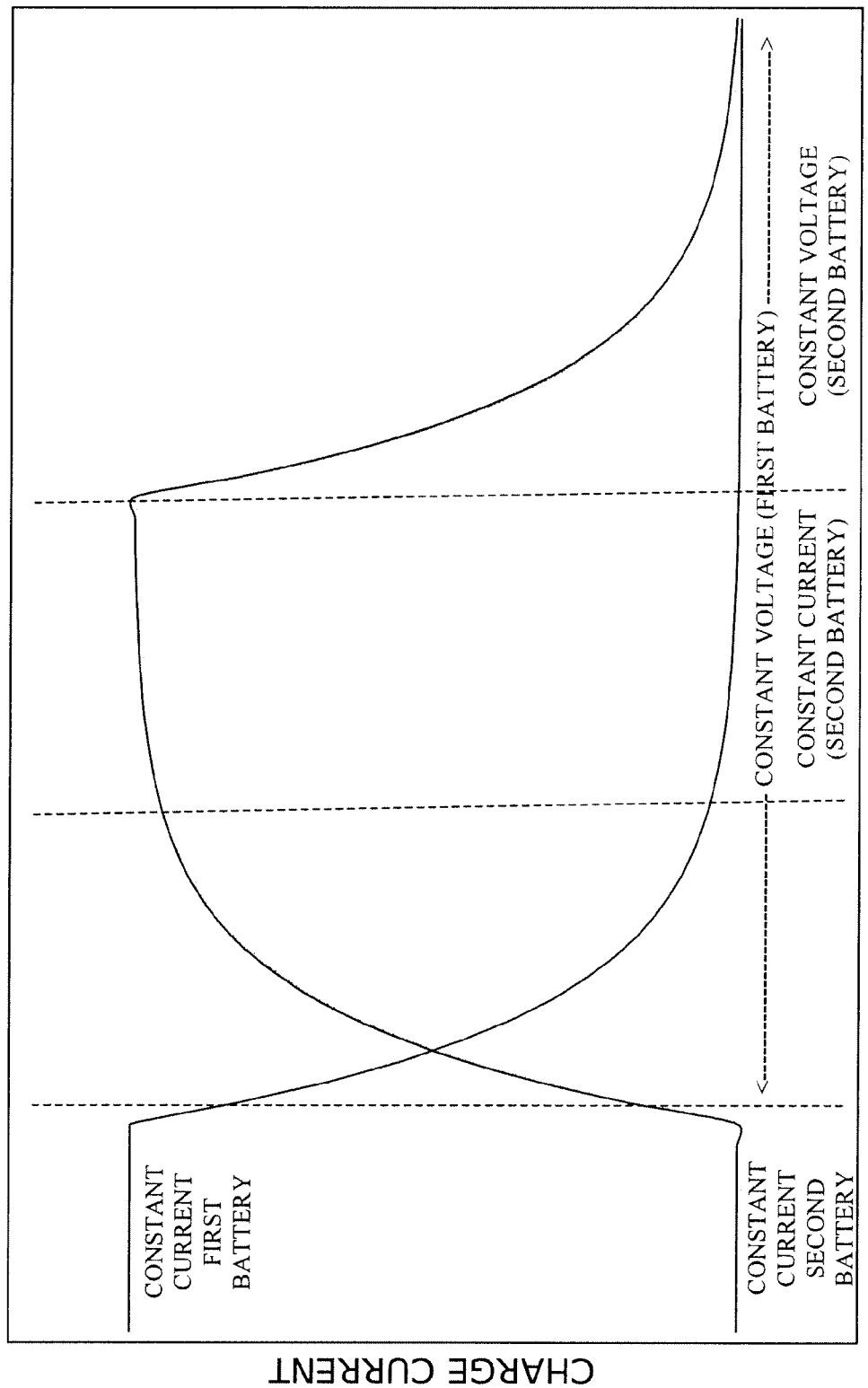
FIG. 4 is a diagram that depicts the resulting charge profiles for the (first) battery of the handheld computing device, and the (second) battery that is held by the battery charger.

The charge profiles for the batteries 106, 110 are shown in FIG. 4.

Exemplary Implementation of Battery Charger 100

Figure 5:
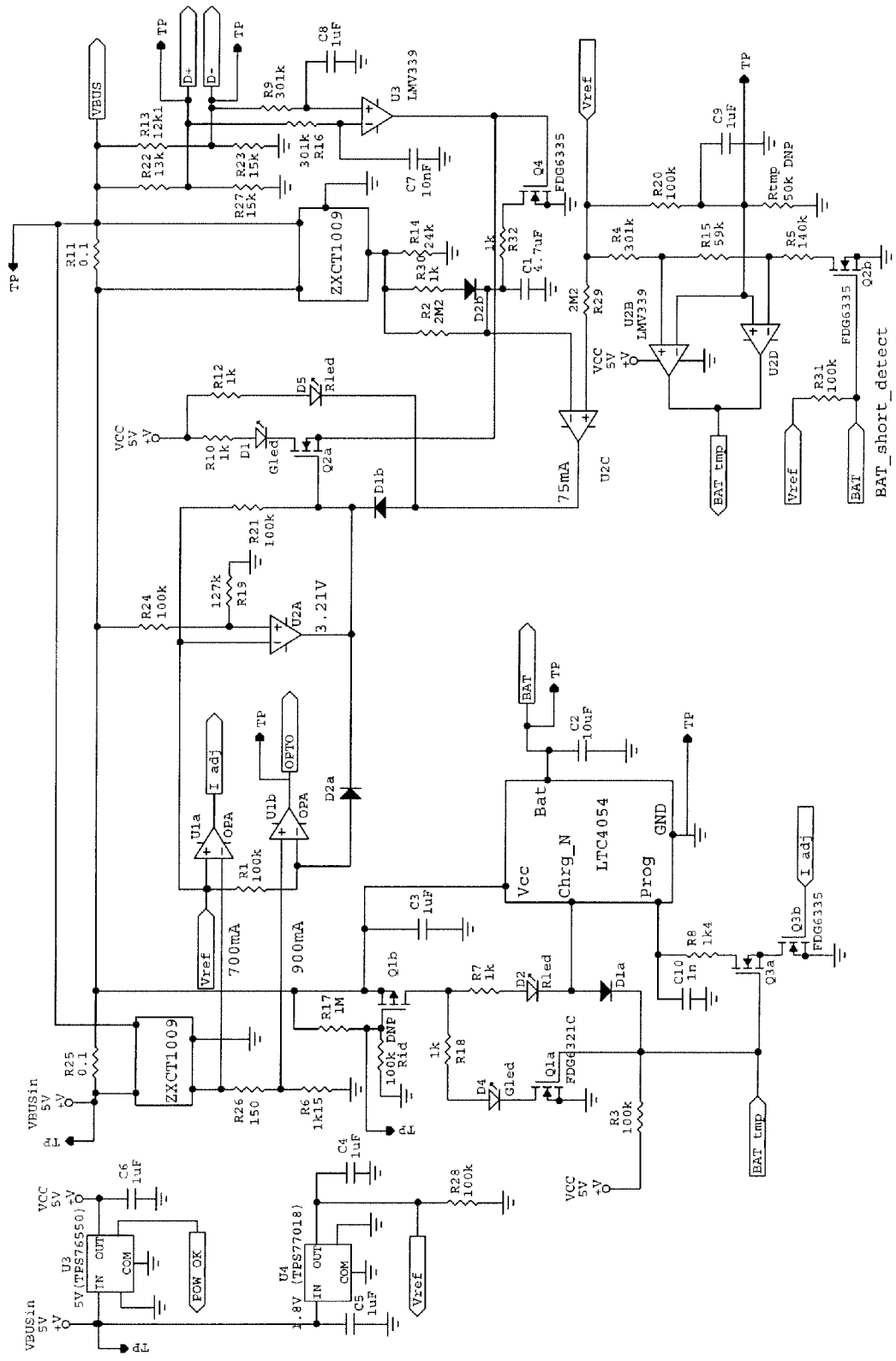
FIG. 5 is a detailed schematic diagram that depicts a preferred implementation of the battery charger.

FIG. 5 depicts an exemplary implementation of a battery charger 100'. Apart from the specific implementation details, the battery charger 100' is substantially identical to the battery charger 100. For ease of understanding, FIG. 5 uses similar reference numerals as in FIG. 1, but denoted with a prime superscript to refer to the corresponding elements of FIG. 1.

The batteries 106, 110 (not shown) are lithium batteries, each rated at 4.2 V. The voltage output 104 of the DC power supply is coupled to a 5V voltage bus (VBUSin) via a Texas Instruments TPS76550 5.0 VDC Low Dropout Voltage Regulator.

The battery charge circuit 202' of the charge manager 200 is implemented with a Linear Technology LTC4054 Standalone Linear Li-ion Battery Charger integrated circuit.

The DC voltage references 222, 322 are implemented with a single Texas Instruments TPS77018 1.8 VDC Low Dropout Linear Regulator.

The differential amplifier 226 of the charge controller 204 is implemented with a Texas Instruments TLV2711 Operational Amplifier. The comparator 326 of the charge state detection circuit 302 is implemented with a Texas Instruments LMV339 Low-Voltage Comparator.

The current monitors 228, 328 are each implemented with a Zetex Semiconductors ZXCT1009 High-Side Current Monitor integrated circuit.

The load resistor 230 of the load current monitoring circuit 224 is implemented with resistor R26 in series with resistor R6. The load resistor 330 of the load current monitoring circuit 324 is implemented with resistor R14.

The secondary charge state indicator 206 is implemented with red LED D2, green LED D4, current limiting resistors R7, R18, and lamp driver transistor Q1a, diode D1a and resistor R3. The primary charge state indication circuit 306 is implemented with red LED D5, green LED D1, current limiting resistors R10, R12, and lamp driver transistor Q2a, diode D1b, resistor R3 and comparator U2C.

The peripheral device detection circuit 308 of the primary charge state indicator 300 is implemented with resistors R13, R22, R23, R27, comparator U3 and transistor Q4.

The battery charger 100' includes operation amplifier U1B, which is implemented with a Texas Instruments TLV2711 Operational Amplifier. The inverting input terminal of the operation amplifier U1B is connected to the junction of the resistors R26, R6 of the load current monitoring circuit 224. The signal output of operation amplifier U1B is connected to a shutdown input of the DC power supply, and serves to disable the DC power supply if the current drawn from the DC power supply, as measured by the current monitor 228, exceeds the rated maximum current for the supply.

The battery charger 100' also includes a battery temperature monitor circuit, which is implemented with comparators U2B, U2D, and ladder resistors R4, R15, R5. The comparators U2B, U2D are implemented with a Texas Instruments LMV339 Low-Voltage Comparator. The inverting input of comparator U2B and the non-inverting input of comparator U2D are commonly connected to a thermistor in the second battery 110. The difference outputs of the comparators U2B, U2D, which are commonly connected to the gate input of transistor Q3a, serve to disable the battery charge circuit 202' when the temperature of the second battery 110 exceeds a rated maximum.

When the handheld computing device 150 is connected to the battery charger 100, the DC power source (via VBUSin) supplies the handheld computing device 150 with primary charge current via the VBUS. The handheld computing device 150 applies a constant charge current to the first lithium battery 106. As this point, the voltage at the non-inverting input to the comparator U2c will be greater than 1.8 VDC, thereby causing the red LED D5 to turn on. In this mode, typically the handheld computing device 150 charges the first battery 106 with a major portion of the current that is available from the DC power source.

At the same time, the operation amplifier U1A adjusts the resistance at the PROG pin of the charge circuit 202' (via transistors Q3a, Q3b and resistor R8) such that the charge circuit 202' charges the second lithium battery 110 with the remaining portion of the current that is available from the DC power source. As this point, the CHARG_N output of the charge circuit 202' is pulled low, thereby causing the red LED D2 to turn on.

The handheld computing device 150 continues to charge the first battery 106 with the constant charge current until the voltage of the battery 106 reaches its rated voltage (4.2 V DC). Thereafter, the handheld computing device 150 charges the first battery 106 with a constant voltage (approx. 4.2 V DC). During this mode, the primary charge current drawn by the handheld computing device 150 from the VBUS decreases exponentially.

In response to the exponentially-decreasing primary charge current, the operation amplifier U1A continues to decrease the resistance at the PROG pin of the charge circuit 202' such that the charge circuit 202' charges the second lithium battery 110 with an exponentially increasing secondary charge current. The feedback loop defined by the transistors Q3a, Q3b, the charge circuit 202', and the current monitor 228 maintains the total of the primary charge current and the secondary charge current substantially constant.

When the primary charge current drops below a predetermined minimum value (e.g. 10% of rated constant-charge current), the voltage at the non-inverting input to the comparator U2c will be less than 1.8 v, thereby causing the red LED D5 to turn off and the green LED D1 to turn on.

When the secondary charge current reaches the rated charge current for the second battery 110, the charge manager 200' charges the second battery 110 with a constant major portion of the current that is available from the DC power source. The feedback loop defined by the transistors Q3a, Q3b, the charge circuit 202', and the current monitor 228 prevents the secondary charge current from exceeding the charge current that is available from the DC power source.

The charge manager 200' continue to charge the second battery 110 with the constant charge current until the voltage of the battery 110 reaches its rated voltage (4.2 V DC). Thereafter, the charge manager 200' charges the battery 110 with a constant voltage (approx. 4.2 V DC). During this mode, the secondary charge current drawn by the battery 110 decreases exponentially.

When the secondary charge current drops below a predetermined minimum value (e.g. 10% of rated constant-charge current), the CHARG_N output of the charge circuit 202' is pulled weakly low, thereby causing the red LED D2 to turn off and the green LED D4 to turn on.

In the preceding example, the first battery 106 was authorized to draw up its rated charge current, and the battery charger 100 would charge the second battery 110 with all of the remaining available charge current. To implement this solution, the magnitude of the DC voltage reference 222 of the charge controller 204 would be equal to the voltage that would be dropped across the load resistor 230 of the load current monitoring circuit 224 when the total current drawn from the DC power source was at the maximum current limit for the power source. With this implementation, the following two charging scenarios are possible (each assuming that the maximum current limit of the DC power source was 1.0 A):

1. If the rated charged current for the second battery 110 was 0.5 A, both batteries 106, 110 would charge at their full rates.

2. If rated charged current for the first battery 106 was 0.7 A, and the rated charged current for the second battery 110 was 0.5 A, the first battery 106 would still charge at its full rate. Since the remaining available charge current would be 0.3 A, the second battery 110 would charge at 60% (0.3 A/0.5 A) of its full rate.

However, the magnitude of the DC voltage reference 222 can be adjusted so that the initial maximum current limit used by the battery charge manager 200 is other than the maximum current limit of the DC power source. By doing so, the initial current split between the first battery 106 and the second battery 110 can be varied as desired. For instance, the voltage output by the DC voltage reference 222 could be varied from the above value to thereby limit the maximum current that is drawn by the first battery 106 to 90% of the maximum current limit of the DC power source. With this latter implementation, the following additional charging scenario would be possible (again assuming that the maximum current limit of the DC power source was 1.0 A):

3. If the rated charged current for the first battery 106 was 1.0 A, and the rated charged current for the second battery 110 was 1.0 A, the first battery 106 would charge at 90% (0.9 A) of its full rate, and the second battery 110 would charge at 10% (0.1 A) of its full rate.

Further, the voltage output by the DC voltage reference 222 could be varied to give charge priority to the second battery 110, as opposed to the first battery 106. It will be appreciated, therefore, that the foregoing embodiment offers considerable flexibility in terms of the possible charging scenarios, in contrast to the prior art.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

The invention claimed is:

1. A battery charger comprising:
   a power source for supplying a primary charge current to a first battery; and
   a charge manager for charging a second battery, the charge manager being coupled to the power source and being configured to charge the second battery with a secondary charge current in accordance with a continuous comparison between a predefined maximum current limit and a total current drawn from the power source;
   wherein the charge manager includes a controlled current/voltage source for supplying the secondary charge current, and a charge manager controller coupled to the controlled source, the charge manager controller being configured to control a magnitude of the secondary charge current by outputting to a control input of the controlled source an analog difference signal proportional to a difference between a magnitude of the maximum current limit and the total drawn current.

2. The battery charger according to claim 1, wherein the charge manager controller comprises a voltage reference, a current monitor coupled to the power source, and a differential amplifier coupled to the voltage reference and the current monitor, the voltage reference being proportional to the maximum current limit, the current monitor being configured to output an analog voltage proportional to the total drawn current, the differential amplifier being configured to output the analog difference signal, the analog difference signal being proportional to a difference between the voltage reference and the analog voltage.

3. The battery charger according to claim 2, wherein the voltage reference is configured to limit the primary charge current to less than a maximum current limit of the power source.

4. The battery charger according to claim 1, wherein the charge manager and the power supply are disposed within a common charger housing, the charger housing comprising comprises a first indicator for indicating a charge state of the first battery, and a second indicator for indicating a charge state of the second battery.

5. The battery charger according to claim 4, wherein the first battery is disposed within a handheld computing device, the charger housing is configured to capture the second battery externally thereto, and further comprises a battery interface for electrically interfacing with the second battery, and a charger output for supplying the primary charge current to the handheld computing device.

6. The battery charger according to claim 1, wherein the charge manager is configured such that, while the handheld computing device charges the first battery with a continuously decreasing portion of the primary charge current, the controlled source charges the second battery with a continuously increasing portion of the secondary charge current, the total of the decreasing portion and the increasing portion being substantially equal to the maximum current limit.

7. The battery charger according to claim 6, wherein the charge manager is configured to charge the second battery with a second major constant portion of the secondary charge current, after a current drawn by the second battery during the continuously increasing charging step exceeds a maximum current threshold, the second major constant portion being substantially equal to the maximum current threshold.

8. The battery charger according to claim 6, wherein the charge manager is configured to charge the second battery with a minor constant portion of the secondary charge current prior to the continuously increasing charging step, while the handheld computing device charges the first battery with a first major constant portion of the primary charge current, the total of the first major portion and the minor portion being substantially equal to the maximum current limit.

9. The battery charger according to claim 7, wherein the charge manager is configured to charge the second battery with a minor constant portion of the secondary charge current prior to the continuously increasing charging step, while the handheld computing device charges the first battery with a first major constant portion of the primary charge current, the total of the first major portion and the minor portion being substantially equal to the maximum current limit.

10. A method of simultaneously charging batteries from a power source, the method comprising supplying a primary charge current from the power source to a first of the batteries, while charging a second of the batteries with a secondary charge current from the power source in accordance with a continuous comparison between a predefined maximum current limit and a total current drawn from the power source;
  wherein the second battery charging includes controlling a magnitude of the secondary charge current by outputting to a control input of a controlled current/voltage source an analog difference signal proportional to a difference between a magnitude of the maximum current limit and the total drawn current.

11. The method according to claim 10, wherein the analog difference signal is determined in accordance with a difference between a voltage reference and an analog voltage signal, the voltage reference being proportional to the maximum current limit, the analog voltage signal being proportional to the total drawn current.

12. The method according to claim 11, wherein the voltage reference limits the primary charge current to less than a maximum current limit of the power source.

13. The method according to claim 10, wherein the first battery is disposed within a handheld computing device, and the second battery charging step comprises charging the second battery with a continuously increasing portion of the secondary charge current while the handheld computing device charges the first battery with a continuously decreasing portion of the primary charge current, the total of the decreasing portion and the increasing portion being substantially equal to the maximum current limit.

14. The method according to claim 13, wherein the second battery charging further comprises charging the second battery with a minor constant portion of the secondary charge current prior to the continuously increasing charging step, while the handheld computing device charges the first battery with a first major constant portion of the primary charge current, the total of the first major portion and the minor portion being substantially equal to the maximum current limit.

15. The method according to claim 13, wherein the second battery charging further comprises charging the second battery with a second major constant portion of the secondary charge current, after a current drawn by the second battery during the continuously increasing charging step exceeds a maximum current threshold, the second major constant portion being substantially equal to the maximum current threshold.

16. The method according to claim 15, wherein the second battery charging further comprises charging the second battery with a minor constant portion of the secondary charge current prior to the continuously increasing charging step, while the handheld computing device charges the first battery with a first major constant portion of the primary charge current, the total of the first major portion and the minor portion being substantially equal to the maximum current limit.

* * * * *